P. B. VENUTI AND C. H. ARNOLD.
MULTIPLE VIEW CAMERA.
APPLICATION FILED MAY 12, 1919.

1,393,411.

Patented Oct. 11, 1921.
5 SHEETS—SHEET 4.

PB Venuti
C.H.Arnold
INVENTORS

BY Edward Reed
ATTORNEY

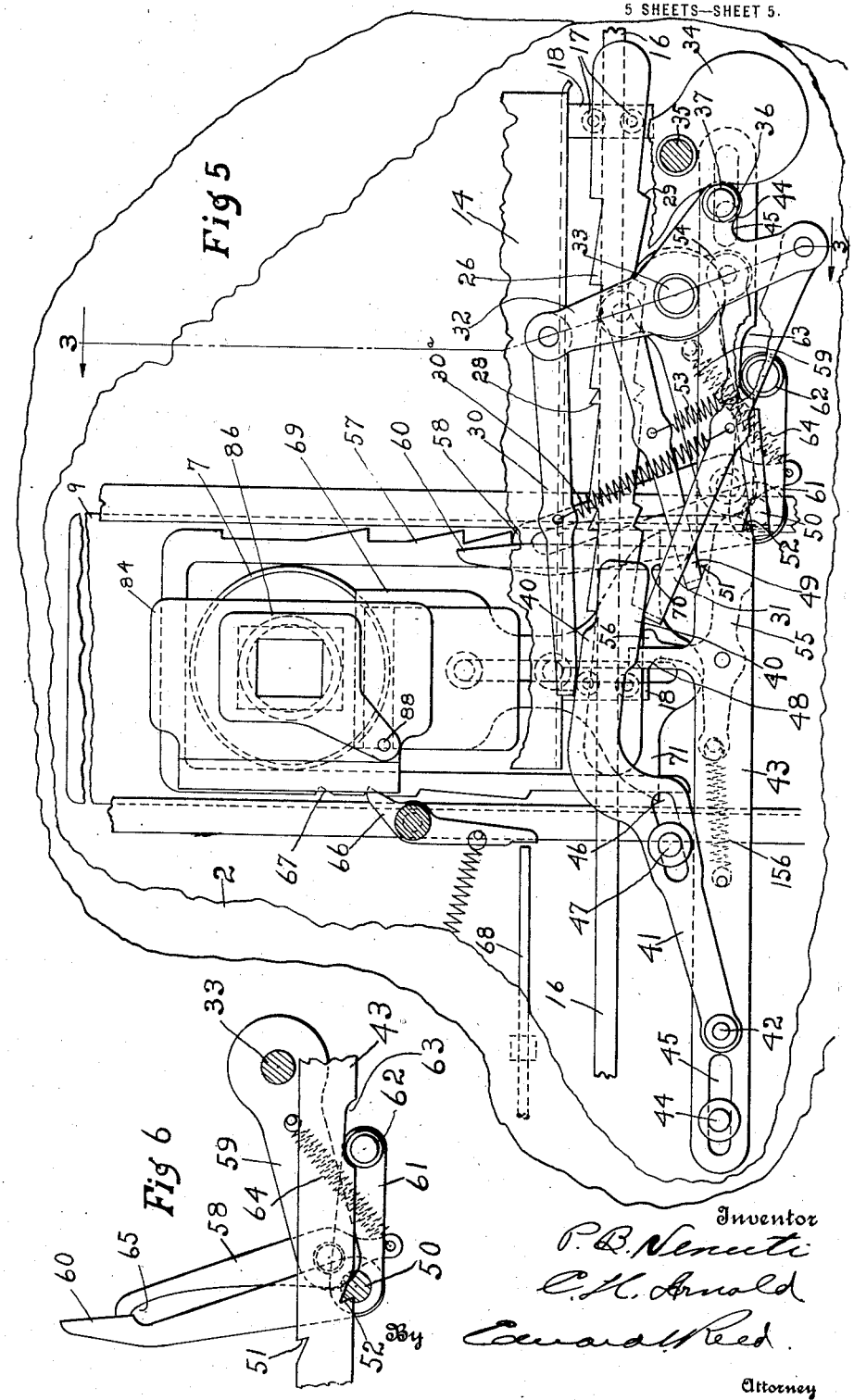

UNITED STATES PATENT OFFICE.

PETER B. VENUTI AND CHARLES H. ARNOLD, OF DAYTON, OHIO, ASSIGNORS TO THE VENUGRAPH COMPANY, OF DAYTON, OHIO, A CORPORATION OF OHIO.

MULTIPLE-VIEW CAMERA.

1,393,411.     Specification of Letters Patent.     Patented Oct. 11, 1921.

Application filed May 12, 1919. Serial No. 296,585.

*To all whom it may concern:*

Be it known that we, PETER B. VENUTI and CHARLES H. ARNOLD, citizens of the United States, residing at Dayton, in the county of Montgomery and State of Ohio, have invented certain new and useful Improvements in Multiple-View Cameras, of which the following is a specification, reference being had therein to the accompanying drawing.

This invention relates to multiple view cameras and one object of the invention is to provide a multiple view camera which will be simple in its construction and positive in its operation.

It is also an object of the invention to provide such a camera in which a plurality of series of exposures may be made upon a single plate, in parallel rows, without moving the plate more than one path.

It is also an object of the invention to provide a camera of this kind which will be so constructed that it can be produced at a relatively low cost.

Other objects of the invention will appear as the mechanism is described in detail.

Figure 1:
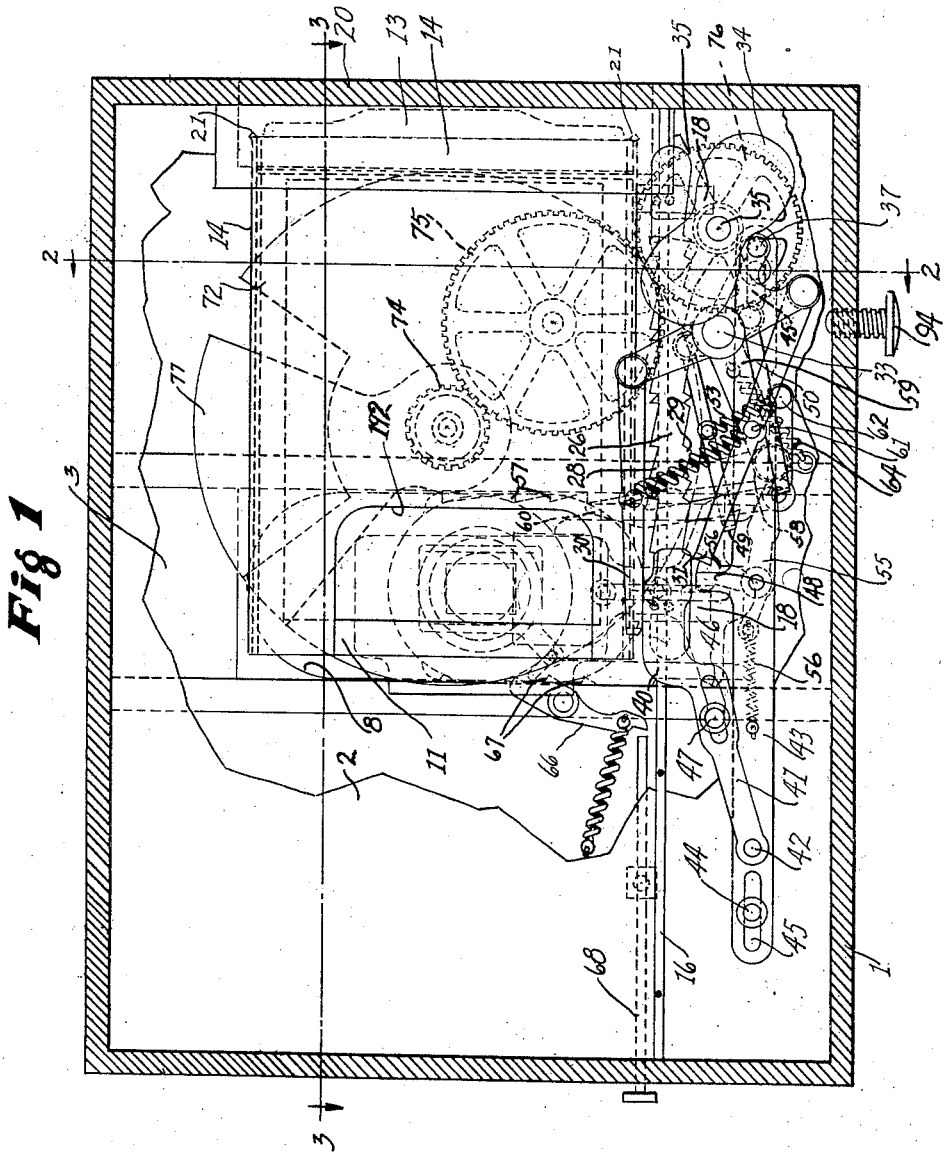
Figure 2:
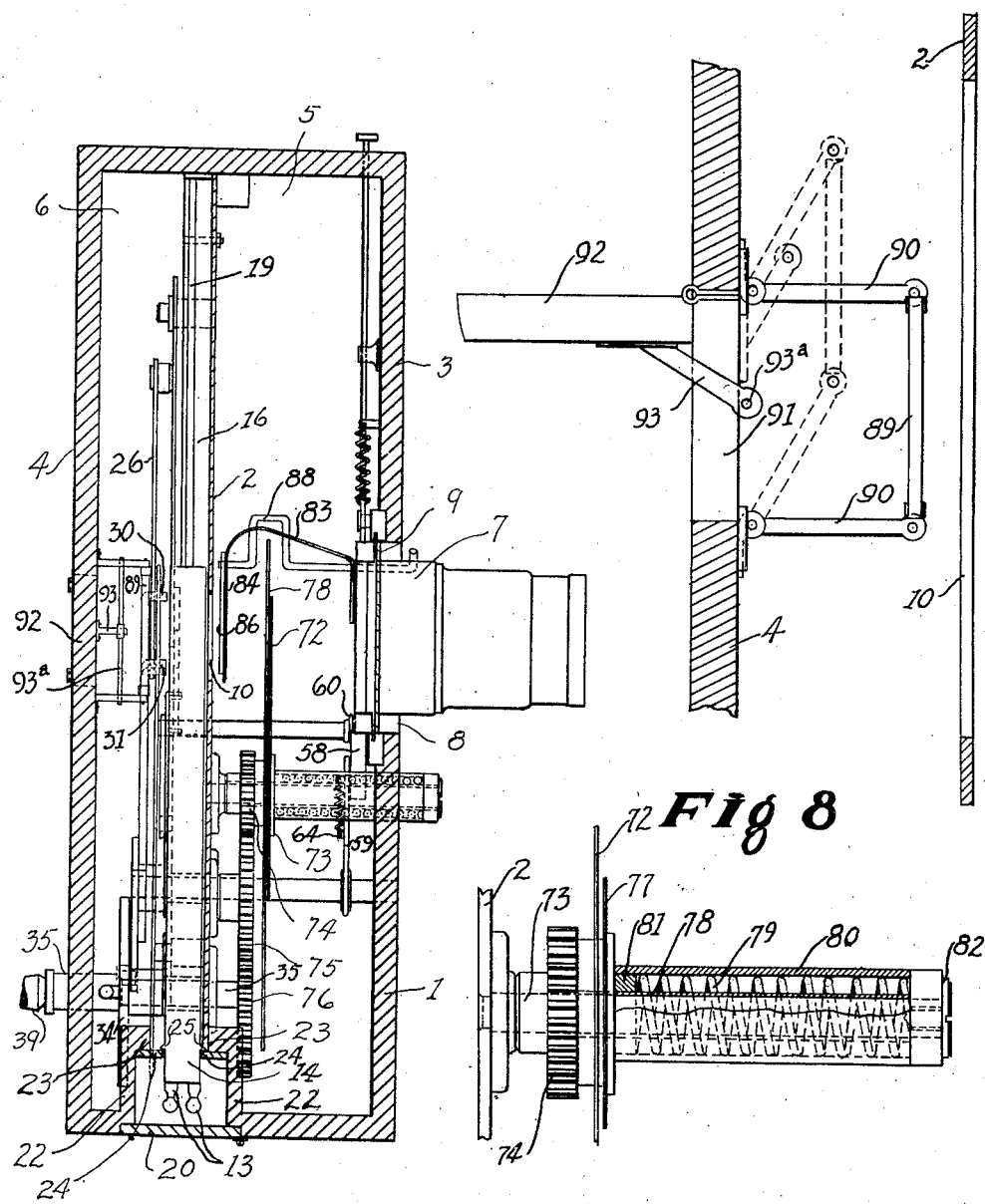
Figure 3:
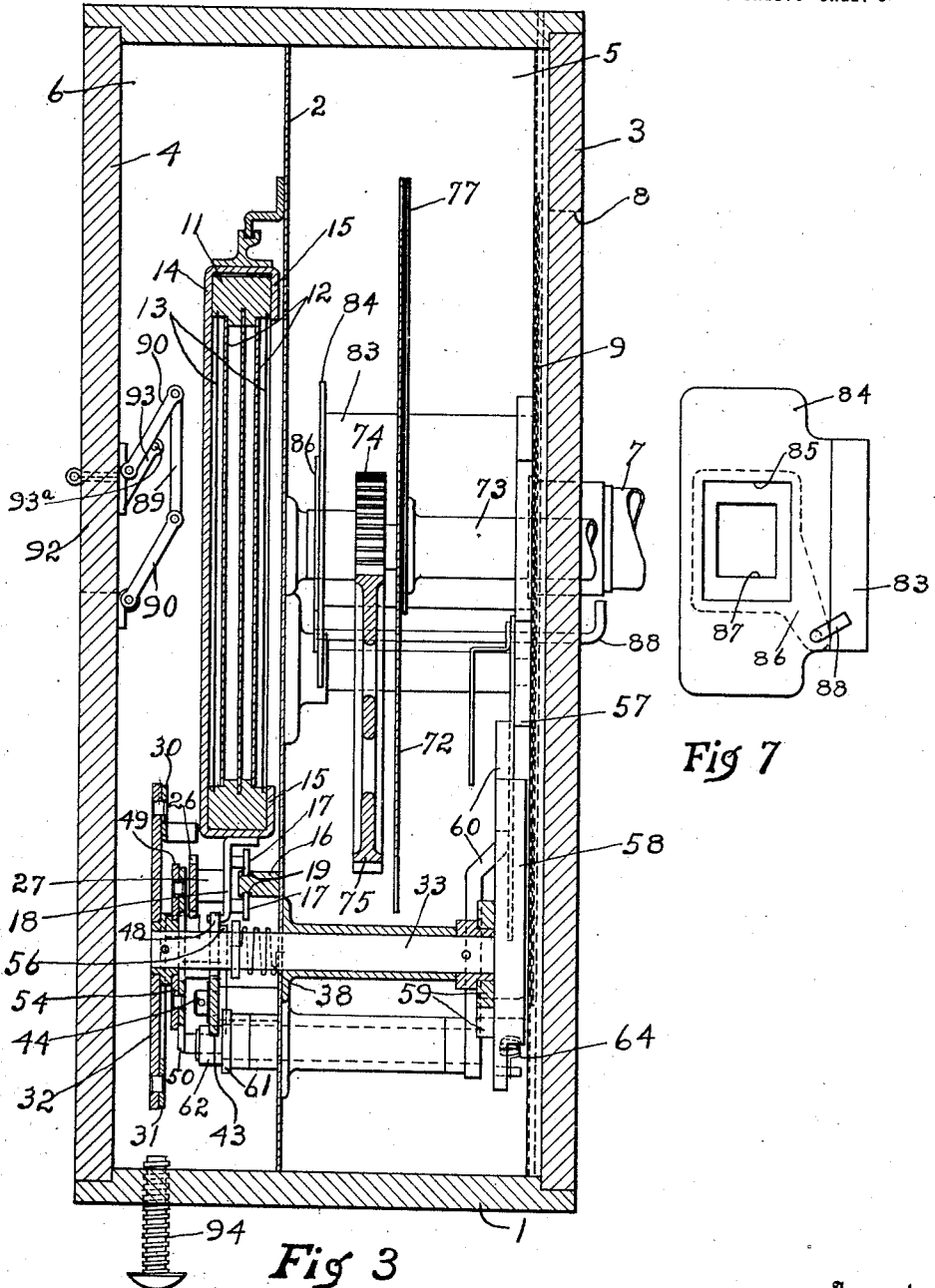
Figure 4:
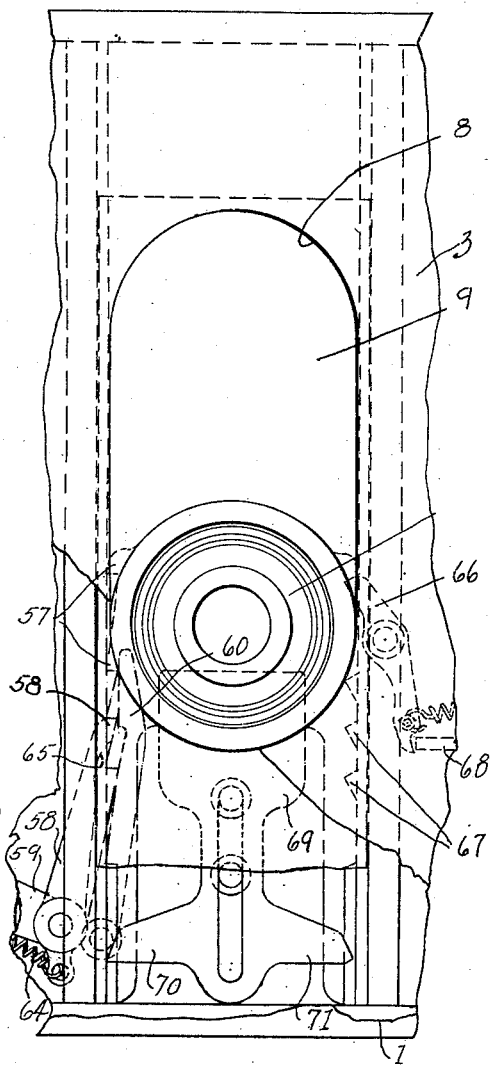

In the accompanying drawings Figure 1 is a sectional view taken through the casing of a camera embodying our invention and showing the operating mechanism in elevation; Fig. 2 is a sectional view taken on the line 2—2 of Fig. 1; Fig. 3 is a sectional view taken on the line 3—3 of Fig. 1; Fig. 4 is a detail view of the lens and its shifting device; Fig. 5 is a side elevation on a larger scale of the carriage and lens operating devices; Fig. 6 is a detail view of the lens actuating device; Fig. 7 is a detail view of the diaphragm; Fig. 8 is a detail view of the focusing screen; and Fig. 9 is a detail view, partly in section, of the shutter.

In carrying out our invention we have provided a lens which can be adjusted to different positions and have provided in connection with said lens a carrier for a plate holder which is capable of step by step movement in a line at right angles to the line of adjustment of said lens. Suitable mechanism is provided for imparting the step by step movement to the carriage for the plate holder and for automatically reversing the direction of that movement when the carriage reaches the limit of its movement in one direction. Means are also provided for automatically adjusting the lens upon the completion of each movement of the carriage in either direction, to bring the lens in line with a different portion of the sensitized plate. These operations may be accomplished in various ways and while we have here shown a particular mechanism for accomplishing the several operations, it will be understood that this has been chosen for the purpose of illustration only, and that this mechanism may be changed and entirely new mechanism substituted therefor without departing from the spirit of our invention.

In that particular embodiment of our invention here illustrated, the camera comprises a casing 1 which may be of any suitable material, and is here shown as rectangular in form and of a relatively small thickness. This casing has mounted therein a partition 2 arranged parallel with the front and rear walls, 3 and 4, thereof and dividing the interior of the casing into two compartments, 5 and 6. Mounted in the front wall 3 of the casing is a lens 7 which is capable of adjustment relatively to the casing. In the present instance the adjustment is in a vertical direction and to this end the front wall 3 of the casing has formed therein a vertically elongated opening 8 in which the lens 7 is mounted. The mounting may be accomplished in various ways but, as here shown, the lens has secured thereto a plate 9 which is slidably mounted in guideways extending along the sides of the opening 8 and which extends above and below the lens 7 distances sufficient to close the opening 8 in all positions of the lens with relation thereto. This lens may be adjusted in any suitable manner but, preferably, the adjustment is accomplished automatically by the operating mechanism, as will be hereinafter described. The partition 2 has a vertically elongated opening 10 arranged in line with the opening 8 in the front wall of the casing and of such a length that it will be in alinement with the lens in all positions thereof, and will serve to permit the passage of light from the lens to the sensitized plate, which is supported in the compartment 6 for movement in a direction at right angles to the line of adjustment of the lens, and the supporting means are of such a character that the plate may be shifted step by step first in one direction and then in the other. During the step by step movement in one direction a series of exposures will be made across the length of the plate. At the end of the movement of the plate in one direction the lens is shifted in a vertical direction to bring it in line with another portion of the plate so that as the plate is moved in the opposite direction a second series of exposures will be made thereon in a line parallel with the first series of exposures and adjacent thereto. The sensitized plate may be of any suitable character and it will be understood that the term "plate" as herein used is intended to include any sensitized surface on which the exposures may be made, whether the sensitized coating is mounted on glass, film, or other material. Various means may be provided for supporting the plate and imparting movement thereto and the character of the supporting means will depend, in a measure at least, upon the character of the plate. In the present construction, however, the plate is mounted in a plate holder, which is here shown at 11 as of a well known commercial type adapted to carry two plates, as shown at 12, and having on each side thereof a slide 13 which may be withdrawn to uncover the plate and permit an exposure to be made thereon when the lens is open. The plate holder is mounted on a carriage 14 which, in the present instance, is formed from a plate of metal having its upper and lower edges bent to form guideways for the upper and lower edges of the plate holder, as shown at 15. The bent portions of the plate holder extend upwardly and downwardly, respectively, only far enough to form the guideways and, consequently, they do not overlap the edge of the plate, and when the slide 13 adjacent to the open side of the carriage is withdrawn the full area of the plate will be exposed. This carriage is supported for reciprocatory movement lengthwise of the casing and in a plane parallel with the front wall of the casing and, consequently, parallel with the vertical plane for the lens. This is accomplished in the present construction by providing within the casing a suitable track which is here shown as a bar 16 extending lengthwise of the casing and rigidly secured to the partition 2. The track bar extends between and coöperates with projections or rollers 17 secured to the carriage and, in the present instance, mounted upon a bracket 18 rigidly secured to and forming a part of the carriage 14, there being two of these brackets arranged near the opposite ends of the carriage. The track bar 16 is preferably provided in its upper and lower surfaces with grooves or channels 19 in which the rollers 17 travel, and which serve to prevent any lateral movement of the carriage and to thus retain the sensitized plate always the same distance from the lens, and to thus maintain the focus after the same has once been established. The end wall of the casing 1 is provided with a door 20 in alinement with the carriage 14 and through which the plate holder may be inserted and withdrawn, and the slides 13 manipulated while the plate holder is in position. To facilitate the insertion of the plate holder the upper and lower walls of the carriage are slightly flared, as shown at 21. We also prefer to provide the casing 1 along the edges of the opening for the door 20 with inwardly extending walls 22 having at their inner ends flanges 23 to which are secured guards 24 of yieldable material, such as felt, which engage shoulders 25 on the plate holder to exclude the light from the plate when the door 20 is open to permit the withdrawal or insertion of one of the slides 13.

Reciprocatory movement may be imparted to the carriage in any suitable manner which will cause the sensitized plate to be advanced step by step across the line of the lens. In the present construction we have utilized a pawl and rack mechanism for accomplishing this movement and, to that end, have secured to the carriage a suitable rack bar 26 which is here shown as connected with the brackets 18 by means of studs 27. This rack bar is provided at its upper and lower edges respectively with ratchet teeth 28 and 29, the two series of teeth facing in opposite directions. Arranged near the rack bar are two pawls 30 and 31 which coöperate, respectively, with the teeth 28 and 29, which pawls are moved toward the rack bar by a spring 30ª and are so controlled that they cannot both act upon the rack at the same time. Consequently, when the rack bar and the carriage are being moved in one direction by one pawl, this movement will not be in any way interfered with by the other pawl. As here shown, the pawls 30 and 31 are pivotally mounted on the opposite ends of a rock arm 32 which is rigidly secured between its ends to a shaft 33. Rocking movement is imparted to the shaft 33 and arm 32 by means of a cam 34 rigidly secured to a shaft 35 and coöperating with a rock arm 36 also secured to the shaft 33 and, in the present construction, formed integral with the rock arm 32. The rock arm 36 is preferably provided with a lateral projection, such as a roller 37, which lies in the path of the cam 34. The roller 37 is held constantly in engagement with the surface of the cam 34 by means of a spring 38 connected with the rock arm 36 and, in the present instance, coiled about the shaft 33. The cam 34 is here shown in the form of a double cam so that two complete movements will be imparted to the rock arm 32 and, consequently, to the pawls carried thereby, upon each rotation of the shaft 35. Any suitable means may be employed for rotating the shaft 35, but as here shown, the end of the shaft extends through the rear wall of the casing and has secured thereto a crank 39.

At the end of each complete movement in either direction, the direction of movement of the carriage is automatically reversed, without interfering with the continuous movement of the shaft 35 in one direction. This is preferably accomplished by providing a controlling device for the pawls 30 and 31 which will move the one pawl into an inoperative position, when the rack reaches the end of its movement, and will permit the other pawl to move into operative relation to the rack. As here shown, this controlling device is in the form of a guard plate 40 secured to and forming a part of an arm 41 which is pivotally mounted at 42 on a bar 43 extending parallel with the rack bar 26 and mounted for a limited longitudinal movement. In the present construction the bar 43 is carried by studs 44 mounted on the partition 2 and extending through slots 45 in the bar. The guard 40 overlaps the end of the rack bar 26 and is of such size and shape and is so arranged that when in its uppermost position it will hold the upper pawl 30 out of engagement with the rack, when in its lowermost position it will hold the lower pawl 31 out of engagement with the rack, and when in an intermediate position it will hold both pawls out of engagement with the rack. In the present drawings the guard plate 40, bar 43 and their associated mechanisms are shown in their intermediate positions. The guard arm is provided with a cam slot 46 through which extends a pin 47 mounted on a fixed part of the structure, in the present instance on the partition 2. Consequently, the longitudinal movement of the bar 43 will cause the guard plate 40 to be raised or lowered according to the direction of movement of the bar 43. Longitudinal movement is imparted to the bar 43 by the carriage 14 and, in the present construction, the bar has an upwardly extending finger 48 which lies between and in the path of the two depending brackets 18. This finger is so arranged that as the carriage nears the end of its movement in one direction the rear bracket 18 will engage the arm 48 and impart initial movement to the bar 43, this movement being sufficient to move the guard plate 40 into its intermediate position, and thus prevent any operation of the rack bar by the pawls 30 and 31. The movements of the bar 43 and of the guard plate 40 are completed by supplemental pawls 49 and 50, which coöperate respectively with teeth 51 and 52 in the respective edges of the bar 43. These pawls are connected one to another by a string 53 which tends to move them toward the bar 43 and are here shown as pivotally mounted on the respective ends of the second rock arm 54, which is also rigidly secured to the shaft 33. When the bar 43 is at one limit of its movement, which is its normal position, the teeth 51 and 52 in the bar 43 will be so arranged with relation to the respective pawls that the pawls will be inoperative. To prevent one of these pawls from engaging its tooth in the bar 43 and interfering with the movement of that bar, when the latter is actuated by the carriage, we have mounted on the bar 43 an arm 55 which is pivotally mounted between its ends and has one end connected to the bar by means of a spring 156, which tends to hold the other end of the arm normally in an intermediate position. The free end of the arm, however, is so arranged that when moved downwardly it will engage the pawl 50 and move the same into an inoperative position and, when moved upwardly from its normal position, it will engage the pawl 49 and move it into an inoperative position. This arm 55 is actuated, before longitudinal movement is imparted to the bar 43, to move the pawl, 49 or 50, into an inoperative position where it will not interfere with the movement of the bar. To this end the arm is provided with an upwardly extending finger 56 having an enlarged end portion which, when the arm is in its normal position, projects on both sides of the finger 48 of the rack bar. As the bracket on the carriage moves toward the finger 48 on the bar 43, it will first engage the finger 56 and rock the arm 55 in a direction to move the supplemental pawl into its inoperative position, and it will be held in this position while the bracket 18 engages the finger 48 and imparts movement to the bar 43. While the arm 55 holds the one supplemental pawl in its operative position and while the guard plate 40 renders both of the main pawls 30 and 31 inoperative, the other supplemental pawl will engage the bar 43 and complete the movement thereof in the direction in which it was started by the carriage, thereby completing the movement of the guard plate 40 and rendering operative the main pawl which will move the carriage in the opposite direction. It will be apparent that during the reversing operation there will be an interval when the carriage will be stationary, that is, while the two main pawls are held inoperative, and this interval is utilized for the adjustment of the lens. The means for adjusting the lens is preferably actuated from the operating mechanism for the carriage in timed relation to the movements of the carriage and, therefore, we prefer that its adjustment should be controlled by the position of the carriage. In that form of the device here illustrated the plate 9 which carries the lens 7 is provided along one edge with a series of teeth 57 with which coöperates a pawl 58 which is pivotally mounted on the end of an arm 59 rigidly secured to the shaft 33, so that the pawl will be actuated upon each rocking movement of the shaft 33. Inasmuch as the lens is to be adjusted only after several movements have been imparted to the shaft 33, we have provided means for normally holding the pawl 58 in an inoperative position, and this means is here shown as consisting of a finger 60 pivotally mounted on a fixed axis adjacent to the end of the arm 59 which carries the pawl 58. Connected with the arm 60 is a second arm 61 having a laterally extending projection or roller 62 which, when the bar 43 is in its normal position, that is, at either extreme limit of its movement, will rest upon the edge of the bar and will cause the arm 60 to engage the nose of the pawl 58 and hold the latter in an inoperative position, in which position it cannot engage the teeth 57 of the lens supporting plate. The bar 43 has in its lower edge a recess 63 which is so arranged that it will be moved into the path of the projection 62 of the arm 61 when initial movement has been imparted to the bar 43 and the projection 62 will enter the recess and permit the rearward movement of the arm 60, this movement being imparted to the arm by the pawl 58 which is acted upon by a spring 64. The same movement of the pawl which forces the arm 60 rearwardly will cause the pawl to engage the teeth of its rack and the next movement of the shaft 33 will cause lifting movement to be imparted to the pawl and the lens supporting plate. When further movement is imparted to the bar 43 the recess 63 will be moved out of alinement with the projection 62 and the arms 61 and 60 will be returned to their normal positions. However, there is enough lost motion in the movement of the supplemental pawls, and the length of the recess 63 in the bar 43 is such, that no movement will be imparted to the arm 60 until the pawl 58 has completed, or practically completed, its upward movement. The upper end of the arm 60 will then enter a recessed or cut-away portion 65 in the face of the pawl, and will not move the pawl out of engagement with its rack teeth. When the pawl begins its downward movement it will ride over the end of the arm 60 and will be forced rearwardly into its inoperative position. When the lens adjusting pawl has completed its lifting movement, one of the supplemental pawls, 49 or 50, will engage the bar 43 and complete the movement thereof, thereby rendering one of the main pawls operative and causing the rack bar and the carriage to be moved in a reverse direction. The lens will be retained in its elevated position by means of a spring actuated detent 66 which engages the teeth 67 in the lens supporting plate 9. When it is desired to return the lens to its initial position the detent may be released by means of a push rod 68 slidably mounted in the casing 1 and arranged to engage the tail of the detent.

To prevent double exposures being made upon the sensitized plate by a continued operation of the operating handle after the last row of exposures has been completed, we have provided means for closing the lens when the carriage has completed its last movements. To this end we have slidably mounted on the lens supporting plate 9 a guard or cut off 69 which, when in its elevated position, will be interspersed between the lens and the plate and will thus close the lens. This guard has connected therewith a laterally extending finger 70 which lies below the last tooth of the rack 57 and is arranged to be engaged by the pawl 58 if that pawl is again operated after the lens has been moved to its uppermost position. The pawl by so engaging the finger 70 will lift the guard into its operative position and a second finger 71, also carried by the guard 69, will be engaged by the detent 66 and the guard thus retained in a position to close the lens. The finger 71 is of such a length that it will pass the end of the detent 66 without moving the same out of engagement with that tooth of the rack 67 with which it is then in engagement and, consequently, the lens supporting plate is not released, or made to depend upon the pawl 58 to maintain its adjustment.

A suitable shutter is interposed between the lens and the light opening 10 in the partition 2, and this shutter is preferably of the adjustable disk type, as shown at 72, and is mounted upon a stud 73 riveted in the partition 2. The shutter is preferably operated by the same mechanism which operates the plate and lens adjusting devices, and we have here shown a gear 74 secured to the disk 72 of the shutter and connected by means of an intermediate gear 75 with a gear 76 on the shaft 35. The ratio of this gearing is such that the shutter will make two complete rotations for each rotation of the shaft 35, thus adapting the same to the double nosed cam 34, which causes the plate carriage to be advanced two steps for each rotation of the shaft 35. The shutter opening is preferably adjustable to accommodate it to lens openings of different sizes and, to this end, the disk of the shutter proper has a sector shaped opening which is partially closed by a segment 77 which can be adjusted to vary the size of the opening between the edge of the segment and the edge of the disk. This adjustment may be secured in various ways but, in the present instance, the segment is secured to the end of a sleeve 78 surrounding the shaft 73. A spring 79 is coiled about the sleeve 78 and is confined within a housing 80 which extends over the same and is supported at one end by a collar 81 rigidly secured to and forming a part of the sleeve 78. The spring 79 is confined under tension between the collar 81 and the outer end of the housing 80, the latter being held in position by means of a screw 82 extending through the end of the same and into the shaft 73. Thus the spring exerts a constant pressure against the segmental disk and holds the same firmly in place, at the same time permitting of its ready adjustment.

A bracket 83 is secured to the adjustable lens and supports a suitable diaphragm between the lens and the light opening 10 in the partition 2. This diaphragm is adjustable in size and, to this end, the bracket 83 carries a plate 84 constituting the main diaphragm, and having formed therein an opening 85 of the largest size which it is desired to use. Pivotally mounted adjacent to the plate 84 is a swinging plate 86 having therein an opening 87 of a smaller size. This plate is so mounted that it can be swung into alinement with the opening 85 or can be moved entirely away from the same. As here shown, the movable plate 86 is carried by a rod 88 journaled in the front wall 3 of the casing and extending beyond the same so that it can be manipulated to adjust the diaphragm.

We have also provided the device with a ground glass which is so mounted that it can be moved into a position in line with the lens for focusing purposes, and can then be moved into an idle position out of the path of the carriage. As here shown, the ground glass 89 is pivotally mounted at its upper and lower edges on arms 90 which, in turn, are pivotally mounted on the rear wall 4 of the casing above and below a door opening 91, which is provided with a door 92 hinged at the upper edge thereof. The door is provided with an arm 93, which carries a rod 93ª arranged to engage the upper pair of arms 90 to move the ground glass into the position shown in dotted lines in Fig. 8, in which position the ground glass will be out of the path of the carriage 14 and when the door is opened the ground glass will be swung downwardly by gravity into the position shown in full lines in Fig. 8, in which position it is in alinement with the light opening 10 in the partition 2 and the lens 7. The carriage 14 has that portion of its rear wall which lies between the ground glass and the lens cut away, as shown at 192, to permit the lens to be focused when the carriage is in its initial position.

It will be noted that we have provided both the rack bar 26 and the lens supporting plate 9 with a double series of teeth, that is, the teeth are so arranged that the pawls will be caused to engage alternate teeth, and by controlling the throw of the pawls they can be caused to engage the teeth in different sequences so as to cause the racks to be moved different distances upon each operation of the pawls. In the present construction this adjustment is effected by projecting into the casing 1 a stud 94, which is here shown as screw threaded into the lower wall of the casing, and which when in its innermost position will lie in the rear of the lower end of the rock arm 32 and will limit its rearward movement under the action of the spring, thus shortening the throw of both the pawls 30 and 31 and of the pawl 58.

The operation of the mechanism will be readily understood from the foregoing description of the several parts thereof, and it will be apparent that when a series of pictures is to be made, a plate holder containing a sensitized plate is inserted in the carriage, the slide withdrawn from the plate holder and the operating handle manipulated to cause movement to be imparted to the carriage for the plate holder. When the carriage reaches the extreme limit of its movement the operating mechanism is reversed to cause the carriage to move in a reverse direction and the lens is moved up one step so that as the plate holder returns to its starting point a second series of exposures will be made on the plate above and adjacent to the first series of exposures. When the carriage reaches the end of its movement in this direction, the operating mechanism is again reversed and the lens again elevated one step. It will be apparent that the mechanism is very simple in its construction and its operation, and that the several parts are of such a character that they can be easily made, thus enabling the device to be produced at a relatively low cost. Further, it will be apparent that because it is necessary to move the plate in one direction only, the operating mechanism therefor is much simplified and is rendered more positive in its operation.

While we have shown and described one embodiment of our invention, we wish it to be understood that we do not desire to be limited to details thereof, as various modifications may occur to a person skilled in the art.

Having thus fully described our invention, what we claim as new and desire to secure by Letters Patent is:

1. In a mechanism of the character described, a lens, a support for a sentitized plate, means for imparting to said support a series of movements in a plane transverse to said lens, said lens being stationary during said series of movements, and means for moving said lens into line with another portion of said plate when said support has completed said series of movements.

2. In a mechanism of the character described, a lens, a support for a sensitized plate, means for imparting step by step movement to the support for said plate in a direction transverse to said lens and for reversing the direction of said movement, and means for moving said lens in a plane parallel with said plate and transverse to the direction of movement of said support, after said support has completed its movement in one direction and before it begins its movement in the other direction.

3. In a mechanism of the character described, a lens, a support for a sensitized plate, means for imparting reciprocatory movement to the support for said plate and for interrupting the movement of said support at the limit of its travel in one direction, and means for moving said lens transversely to the line of movement of said support and in a plane parallel therewith during said interruption of the movement of said support.

4. In a mechanism of the character described, a lens, a support for a sentitized plate, said lens and said support being mounted for movement in parallel planes and in directions extending transversely one to the other, and means for imparting a series of movements to said support and for imparting a single movement to said lens when said support has completed said series of movements.

5. In a mechanism of the character described, a lens, a support for a sensitized plate, means for imparting step by step movement to the support for said plate in a direction transverse to said lens, and means controlled by the movement of said support to move said lens transversely to the line of movement of said support and in a plane parallel with the plane of said plate.

6. In a mechanism of the character described, a lens, a support for a sensitized plate, an operating device, operative connections between said device and said lens and between said device and the support for said plate to move said lens and said support in parallel planes, and means controlled by the movement of said support to render the connection between said device and said lens normally inoperative.

7. In a mechanism of the character described, a lens, a support for a sensitized plate, an operating device, an operative connection between said device and said support to cause a series of movements to be imparted to said plate, an operative connection between said device and said lens to cause a single movement to be imparted to said lens in a direction transverse to the direction of movement of said plate, and means to render one of said connections inoperative while the other connection is operative.

8. In a mechanism of the character described, a lens, a sensitized plate movably mounted with relation to said lens, an operating device, operative connections between said operating device and said lens and between said operating device and said plate to move said lens and said plate in parallel planes and means controlled by the movement of said plate to render the connection between said operating device and said lens normally inoperative.

9. In a mechanism of the character described, a lens, a sensitized plate movably mounted with relation to said lens, an operating device, an operative connection between said device and said plate to cause a series of movements to be imparted to said plate, an operative connection between said device and said lens to cause a single movement to be imparted to said lens in a plane parallel to said plate and in a direction transverse to the line of movement of said plate, and means to render one of said connections inoperative while the other is operative.

10. In a mechanism of the character described, a lens, a support for a sensitized plate, an operating device, a normally inoperative connection between said device and said lens to impart movement to the latter, an operative connection between said device and the support for said plate to move the same relatively to said lens, means to render the connection between said operating device and said support inoperative and for rendering the connection between said operating device and said lens operative.

11. In a mechanism of the character described, a lens, a support for a sensitized plate, an operating device, means for connecting said operating device with said support for said plate to move the latter step by step in a direction transverse to said lens, a normally inoperative connection between said operating device and said lens to impart vertical movement to said lens, and means controlled by the movement of the support for said plate to render the connection between said support and said operating device inoperative when said support is near the end of its movement in one direction and to render the connection between said operating device and said lens operative.

12. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, and means to render one of said pawls inoperative during the movement of said carriage in one direction and to render the other pawl inoperative during the movement of said carriage in the opposite direction.

13. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, means to hold one of said pawls in an inoperative position while the other pawl is in an operative position with relation to said toothed member, and means for automatically reversing the positions of said pawls at the limit of movement of said carriage in either direction.

14. In a mechanism of the character described, a lens, a carriage mounted for movement transversely to said lens and adapted to support a sensitized plate, a member connected with said plate and having teeth at the opposite edges thereof, pawls arranged on opposite sides of said toothed member to coöperate with the teeth in the respective edges thereof, means for actuating said pawls, a guard arranged to hold one pawl out of engagement with its teeth while the other pawl is operative, and means to shift said guard to hold the last mentioned pawl out of engagement with its teeth while the first mentioned pawl is in an operative position.

15. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, a controlling device so arranged that when in one position it will render one of said pawls inoperative, when in another position it will render the other of said pawls inoperative, and when in a third position will render both pawls inoperative, and means for actuating said controlling device.

16. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, a controlling device so arranged that when in one position it will render one of said pawls inoperative, when in another position it will render the other of said pawls inoperative, and when in a third position will render both pawls inoperative, and means controlled by the position of said carriage for actuating said controlling device.

17. In a mechanism of the character described, a lens, a carriage mounted for movement transversely to said lens and adapted to support a sensitized plate, a member connected with said carriage and having teeth at the opposite edges thereof, pawls arranged on opposite sides of said member and coöperating with the teeth at the respective edges thereof to move said carriage in opposite directions, a controlling device arranged between said pawls and movable relatively thereto to render one or the other of said pawls inoperative, and means for actuating said controlling device comprising a part arranged to be actuated by said carriage as the latter nears the end of its movement in either direction.

18. In a mechanism of the character described, a lens, a carriage mounted for movement transversely to said lens and adapted to support a sensitized plate, a toothed member connected with said carriage, pawls coöperating with said toothed member to move said carriage in opposite directions, a bar movably mounted adjacent to said carriage and having a part arranged to be engaged thereby, a controlling device for said pawls comprising an arm pivotally mounted on said bar and having a cam slot therein, and a fixed stud extending through said slot.

19. In a mechanism of the character described, a lens, a carriage mounted for movement transversely to said lens and adapted to support a sensitized plate, a toothed member connected with said carriage, a rock arm, a pair of pawls connected with said rock arm and arranged to coöperate with said toothed member to move said carriage in opposite directions, means for actuating said rock arm and means to prevent both of said pawls from operatively engaging said toothed member at the same time.

20. In a mechanism of the character described, a lens, a carriage mounted for movement transversely to said lens and adapted to support a plate, a member connected with said plate and having teeth at the opposite edges thereof, a rock arm pivotally mounted between its ends, pawls connected with said rock arm on opposite sides of its axis and arranged to coöperate with the teeth at the respective edges of said member to move said carriage in opposite directions, means for actuating said rock arm, and means to hold one of said pawls out of engagement with its teeth when the other pawl is in operative relation to its teeth.

21. In a mechanism of the character described, a lens, a carriage mounted for movement transversely to said lens and adapted to support a sensitized plate, a toothed member connected with said carriage, a shaft extending transversely to said toothed member, a rock arm secured to said shaft, a pair of pawls connected with said rock arm and arranged to coöperate with said toothed member to move said carriage in opposite directions, means to render one of said pawls inoperative, an arm connected with said shaft, a cam to actuate the last mentioned arm to impart rocking movement to said shaft, and means for actuating said cam.

22. In a mechanism of the character described, a lens, a carriage mounted for movement transversely to said lens and adapted to support a sensitized plate, a rack bar connected with said carriage and having teeth in its upper and lower edges, a shaft extending transversely to said rack bar, a rock arm secured to said shaft and extending on opposite sides thereof, pawls pivotally connected with said rock arm on opposite sides of said shaft and extending above and below said rack bar to coöperate with the respective teeth therein to move said carriage in opposite directions, a controlling device to prevent both of said pawls from engaging said rack bar at the same time, an arm rigidly secured to said shaft and having a projection, a cam arranged to engage the projection on said arm to operate said shaft, a spring acting on said arm to hold said projection in engagement with said cam, and means for actuating said cam.

23. In a mechanism of the character described, a lens, a carriage mounted for movement transversely to said lens and adapted to support a sensitized plate, a rack bar connected with said carriage and having teeth in its upper and lower edges, a shaft extending transversely to said rack bar, a rock arm secured to said shaft and extending on opposite sides thereof, pawls pivotally connected with said rock arm on opposite sides of said shaft and extending above and below said rack bar to coöperate with the respective teeth therein to move said carriage in opposite directions, a controlling device to prevent both of said pawls from engaging said rack bar at the same time, an arm rigidly secured to said shaft and having a projection, a cam arranged to engage the projection on said arm to operate said shaft, a spring acting on said arm to hold said projection in engagement with said cam, means for actuating said cam, a bar mounted for movement in a direction parallel with the direction of movement of said carriage, and having a part extending in the path of said carriage, and an opertive connection between said bar and said controlling device.

24. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, means for simultaneously imparting movement to said pawls, a controlling device arranged to normally hold one of said pawls in an inoperative position with relation to said toothed member, means for imparting initial movement to said controlling device to move the operative pawl into an inoperative position without rendering the inoperative pawl operative, and to then impart further movement to said controlling device to render the operative pawl inoperative and the inoperative pawl operative.

25. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, means for simultaneously imparting movement to said pawls, a controlling device arranged to normally hold one of said pawls in an inoperative position with relation to said toothed member, means for imparting initial movement to said controlling device to move the operative pawl into an inoperative position without rendering the inoperative pawl operative, and other means to impart further movement to said actuating device to permit the inoperative pawl to operatively engage said toothed member.

26. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, means for actuating said pawls, a controlling device arranged when in one position to render one of said pawls inoperative, and when in another position to render the other of said pawls inoperative, and when in an intermediate position to render both of said pawls inoperative, means controlled by the movement of said carriage to move said controlling device into said intermediate position, and other means to impart further movement to said controlling device and thus reverse the positions of said pawls.

27. In a mechanism of the character described, a lens, a carriage mounted for movement transversely to said lens and adapted to support a sensitized plate, a toothed member connected with said carriage, a pair of pawls coöperating with said toothed membed to move said carriage in opposite directions, means for actuating said pawls, a bar mounted for limited movement relatively to said carriage and having a part arranged to be engaged by said carriage, a controlling device for said pawls comprising an arm pivotally mounted on said bar and having a cam slot, a fixed stud extending through said slot, said controlling device having a part arranged normally to hold one or the other of said pawls in an inoperative position and adapted to be moved into a position to hold both of said pawls in inoperative positions when said carriage engages said bar, and other means to actuate said bar to cause further movement to be imparted to said controlling device to reverse the positions of said pawls.

28. In a mechanism of the character described, a lens, a carriage mounted for movement transversely to said lens and adapted to support a sensitized plate, a toothed member connected with said carriage, a pair of pawls coöperating with said toothed member to move said carriage in opposite directions, means for simultaneously actuating said pawls, a device to control the positions of said pawls with relation to said toothed member, an actuating member for said controlling device comprising a part arranged to be engaged by said carriage to impart initial movement to said controlling device, supplemental pawls arranged to engage said actuating member to move the same in opposite directions, and means actuated by said carriage to move one of said supplemental pawls into an inoperative position to permit the initial movement of said actuating member, and means for actuating said supplemental pawls to cause the other of said supplemental pawls to impart further movement to said actuating member and thus cause said controlling device to reverse the positions of the first mentioned pawls.

29. In a mechanism of the character described, a lens, a carriage mounted for movement transversely to said lens and adapted to support a sensitized plate, a rack bar connected with said carriage and having teeth at the opposite edges thereof, a shaft, a rock arm carried by said shaft, pawls connected with said rock arm on the opposite sides of said shaft and coöperating with said rack bar to move said carriage in opposite directions, an actuating bar arranged parallel with said rack bar and capable of a limited movement, a controlling device operatively connected with said actuating bar and extending between said pawls and arranged normally to hold one of said pawls in an inoperative position, said actuating member having a part arranged to be engaged by said carriage to cause said actuating bar to move said controlling member into a position to render both of said pawls inoperative, said actuating bar having a tooth at each edge thereof, a pair of supplemental pawls connected with said shaft and arranged to coöperate with the respective teeth in said actuating bar to complete its movement after initial movement has been imparted thereto by said carriage, and means actuated by said carriage to move one of said supplemental pawls in an inoperative position before initial movement is imparted to said actuating bar.

30. In a mechanism of the character described, a lens mounted for movement transversely to its axis, a carriage mounted for movement transversely to the line of movement of said lens and adapted to support a sensitized plate, a toothed member connected with said carriage, a pair of pawls coöperating with said toothed member to move said carriage in opposite directions, means for rendering said pawls inoperative when said carriage is near the limit of its movement in one direction, and means for imparting movement to said lens while said pawls are both inoperative.

31. In a mechanism of the character described, a lens mounted for movement transversely to its axis, a carriage mounted for movement transversely to the line of movement of said lens and adapted to support a sensitized plate, a toothed member connected with said carriage, a shaft, a rock arm connected with said shaft, a pair of pawls secured to said rock arm and coöperating with said toothed member to move said carriage in opposite directions, means for rendering both of said pawls inoperative when said carriage is near the limit of its movement in one direction, a normally inoperative actuating device for said lens, and means for rendering said actuating device operative when both of said pawls are inoperative.

32. In a mechanism of the character described, a lens mounted for movement transversely to its axis, a carriage mounted for movement transversely to the line of movement of said lens and adapted to support a sensitized plate, a toothed member connected with said carriage, a shaft, a rock arm connected with said shaft, a pair of pawls secured to said rock arm and coöperating with said toothed member to move said carriage in opposite directions, means for rendering both of said pawls inoperative when said carriage is near the limit of its movement in one direction, an arm secured to said shaft, a pawl carried by said shaft and adapted to impart movement to said lens, means for normally holding said pawl in an inoperative position, and means for rendering said last mentioned pawl operative while both of the first mentioned pawls are inoperative.

33. In a mechanism of the character described, a lens, a movable support for said lens having teeth, a carriage mounted for movement transversely to said lens and adapted to support a sensitized plate, a toothed member connected with said carriage, a shaft, a rock arm secured to said shaft, pawls carried by said rock arm and coöperating with said toothed member to move said carriage in opposite directions, a controlling device for said pawls arranged to normally hold one of said pawls in an inoperative position, an actuating member to move said controlling device into a position to render both of said pawls inoperative, an arm secured to said shaft, a pawl connected with said arm and adapted to engage the toothed support for said lens, and means controlled by said actuating member to hold said last mentioned pawl normally in an inoperative position and to render the same operative when said controlling device is moved into a position to render both of the first mentioned pawls inoperative.

34. In a mechanism of the character described, a lens, a movable support for said lens having teeth, a carriage mounted for movement transversely to said lens and adapted to support a sensitized plate, a toothed member connected with said carriage, a shaft, a rock arm secured to said shaft, pawls carried by said rock arm and coöperating with said toothed member to move said carriage in opposite directions, a controlling device for said pawls arranged to normally hold one of said pawls in an inoperative position, an actuating member to move said controlling device into a position to render both of said pawls inoperative, an arm secured to said shaft, a pawl connected with said arm and adapted to engage the toothed support for said lens, a pivoted arm mounted on a fixed support and arranged to engage the last mentioned pawl and having a part adapted to engage said actuating member and hold said arm in a position to render said pawl inoperative when said actuating member is in its normal position, said actuating member having a recess to receive said part and cause said arm to be retracted to permit the last mentioned pawl to engage the toothed supporting device for said lens when said actuating member has been operated to cause said controlling device to render both of the first mentioned pawls inoperative.

35. In a mechanism of the character described, a lens, a movable support for said lens having teeth, a carriage mounted for movement transversely to said lens and adapted to support a sensitized plate, a toothed member connected with said carriage, a shaft, a rock arm secured to said shaft, pawls carried by said rock arm and cooperating with said toothed member to move said carriage in opposite directions, a controlling device for said pawls arranged to normally hold one of said pawls in an inoperative position, an actuating member for said controlling device having a part to be engaged by said carriage to impart initial movement to said actuating member and said controlling device and move the latter into a position to render both pawls inoperative, a pawl operated by said shaft to engage the toothed support for said lens and actuate the same, means for rendering the last mentioned pawl normally inoperative, said means being controlled by said actuating member to render said pawl operative when initial movement is imparted to said actuating member, and means for imparting further movement to said actuating member to cause said controlling device to reverse the positions of the first mentioned pawls, and to again render the last mentioned pawl inoperative.

36. In a mechanism of the character described, a lens having movement in a direction transverse to its length, a carriage mounted for movement transversely to the line of movement of said lens and adapted to support a sensitized plate, means for imparting step by step movement to said carriage, means for interrupting the movement of said carriage when the latter is near the limit of its movement in one direction, and for imparting movement to said lens while the movement of said carriage is thus interrupted, a detent for retaining said lens in its adjusted position, and manually operated means for actuating said detent to release said lens.

37. In a mechanism of the character described, a lens, a movable support for said lens having teeth, a carriage mounted for movement transversely to said lens and adapted to support a sensitized plate, a toothed member connected with said carriage, a shaft, a rock arm secured to said shaft, pawls carried by said rock arm and coöperating with said toothed member to move said carriage in opposite directions, a controlling device for said pawls arranged to normally hold one of said pawls in an inoperative position, an actuating member to move said controlling device into a position to render both of said pawls inoperative, an arm secured to said shaft, a pawl connected with said arm and adapted to engage the toothed support for said lens, means controlled by said actuating member to hold said last mentioned pawl normally in an inoperative position and to render the same operative when said controlling device is moved into a position to render both of the first mentioned pawls inoperative, a guard adapted to be interposed between said lens and said sensitized plate, and a part connected with said guard and arranged to be engaged by said lens actuating pawl on the next operative movement of said pawl after said lens has been moved into its last position.

38. In a mechanism of the character described, a lens mounted for movement transversely to its axis, a carriage mounted for movement transversely to the line of movement of said lens and adapted to support a sensitized plate, a toothed member connected with said carriage, a pair of pawls coöperating with said toothed member to move said carriage in opposite directions, means for rendering said pawls inoperative when said carriage is near the limit of its movement in one direction, means for imparting movement to said lens while said pawls are both inoperative, a guard adapted to be interposed between said lens and said plate, and means actuated by the lens operating means for moving said guard into its operative position after said lens has been moved into its last position.

39. In a mechanism of the character described, a lens mounted for movement in a direction transverse to its axis, a carriage mounted for movement transversely to the line of movement of said lens and adapted to support a sensitized plate, means for imparting step by step movement to said carriage, an actuating device for said lens to impart movement thereto when said carriage is near the limit of its movement in either direction, a guard adapted to be interposed between said lens and said sensitized plate and having a part adapted to be engaged by the operating means for said lens on the next operative movement thereof after said lens has been moved to the limit of its travel.

40. In a mechanism of the character described, a lens mounted for movement in a direction transverse to its axis, a carriage mounted for movement transversely to the line of movement of said lens and adapted to support a sensitized plate, means for imparting step by step movement to said carriage, an actuating device for said lens to impart movement thereto when said carriage is near the limit of its movement in either direction, a bracket connected with said lens and movable therewith, a diaphragm removably mounted on said bracket.

41. In a mechanism of the character described, a lens, a carriage mounted for movement transversely to said lens and adapted to support a sensitized plate, a toothed member connected with one of said parts, a pair of pawls coöperating with said toothed member to move said parts in opposite directions, means to hold one of said pawls in an inoperative position while the other pawl is in an operative position with relation to said toothed member, and means for automatically reversing the positions of said pawls at the limit of movement of said part in either direction.

42. In a mechanism of the character described, a lens mounted for movement transversely to its axis, a carriage mounted for movement transversely to the line of movement of said lens and adapted to support a sensitized plate, a toothed member connected with one of said parts, a pair of pawls coöperating with said toothed member to move said part in opposite directions, means for rendering said pawls inoperative when said part is near the limit of its movement in one direction, means for imparting movement to the other of said parts while said pawls are both inoperative.

43. In a mechanism of the character described, a lens mounted for movement transversely to its axis, a carriage mounted for movement transversely to the line of movement of said lens and adapted to support a sensitized plate, a toothed member connected with one of said parts, a normally inoperative actuating device connected with the other of the said parts, a pair of pawls coöperating with said toothed member to move the first mentioned parts in opposite directions, means for rendering said pawls inoperative when said first mentioned part is near the limit of its movement in one direction, and means for rendering the actuating device for said other part operative when both of said pawls are inoperative.

44. In a mechanism of the character described, a casing, a lens mounted in said casing, a carriage mounted in said casing for movement transversely to said lens and adapted to receive a plate holder, said casing having a compartment in one end thereof arranged in alinement with said carriage and into which the edge of said plate holder projects when said carriage is in its initial position, and a door in the wall of said casing to permit access to said compartment.

45. In a mechanism of the character described, an adjustable lens, a carriage mounted for movement transversely to said lens and adapted to support a sensitized plate, an operating device comprising a shaft, an operative connection between said shaft and said carriage to cause a series of movements to be imparted to said carriage in a direction transverse to said lens, an operative connection between said shaft and said lens to cause a single movement to be imparted to said lens in a direction transverse to the line of movement of said carriage, a shutter interposed between said lens and said carriage, and an operative connection between said shutter and said shaft.

46. In a mechanism of the character described, a lens mounted for movement transversely to its axis, a carriage mounted for movement transversely to the line of movement of said lens and adapted to support a sensitized plate, means for imparting step by step movement to said lens, and means actuated by the means for imparting movement to said lens to close said lens after the same has been moved into its last position.

47. In a mechanism of the character described, a lens mounted for movement transversely to its axis, a toothed member connected with said lens, a pawl acting on said toothed member to impart step by step movement to said lens, and a plate arranged to be actuated by said pawl to close said lens when the latter has been moved into its last position.

48. In a mechanism of the character described, a lens mounted for movement transversely to its axis, a carriage mounted for movement transversely to the line of movement of said lens and adapted to support a sensitized plate, means for imparting step by step movement to said carriage, a toothed member connected with said lens, a pawl coöperating with said toothed member to impart step by step movement to said lens, a guard plate connected with said lens and movable therewith, and a part carried by said guard plate and arranged to be engaged by said pawl and moved into a position to close said lens after said lens has been moved into its final position.

49. In a mechanism of the character described, a lens mounted for movement transversely to its axis, a carriage mounted for movement transversely to the line of movement of said lens and adapted to support a sensitized plate, means for imparting step by step movement to said carriage, a toothed member connected with said lens, a pawl coöperating with said toothed member to impart step by step movement to said lens, a guard plate connected with said lens and movable therewith, a part carried by said guard plate and arranged to be engaged by said pawl and moved into a position to close said lens after said lens has been moved into its final position, a detent to retain said guard plate in a position to close said lens, and means for releasing said guard plate from said lens.

50. In a mechanism of the character described, a lens, a carriage adapted to support a sensitized plate, means for actuating said carriage, a diaphragm interposed between said lens and the plate on said carriage and comprising a fixed member having an opening therein, a movable member adapted to be moved into alinement with the opening in said fixed member and having a smaller opening therein, and means for moving said movable member into and out of alinement with the opening in said fixed member.

51. In a mechanism of the character described, a casing, a lens mounted in one wall of said casing, means for supporting a sensitized plate in line with said lens, an opening in that wall of said casing opposite said lens, a door to close said opening, a carriage movable along the path lying between said walls, a focusing screen movably supported within said casing adjacent to said opening and arranged normally out of alinement with said lens and out of the path of said carriage, and means actuated by the movement of said door to move said focusing screen into and out of alinement with said lens and said opening.

52. In a mechanism of the character described, a casing, a lens mounted in one wall of said casing, means for supporting a sensitized plate in line with said lens, an opening in that wall of said casing opposite said lens, a door to close said opening, a carriage movable along the path lying between said walls, arms pivotally mounted within said casing on the opposite sides of said opening, a focusing screen supported by the inner ends of said arms and so arranged that when said arms are in one position said focusing screen will be out of alinement with said lens and out of the path of said carriage, and an operative connection between said arms and said closure to cause said focusing screen to be moved into alinement with said opening and said lens when said closure is in its opened position and to be moved into its first mentioned position when said closure is moved to its closed position.

In testimony whereof we affix our signatures hereto.

PETER B. VENUTI.
CHARLES H. ARNOLD.